Nov. 6, 1928.
J. LAMB
1,690,733
MICROMETER GAUGE
Filed Sept. 28, 1927
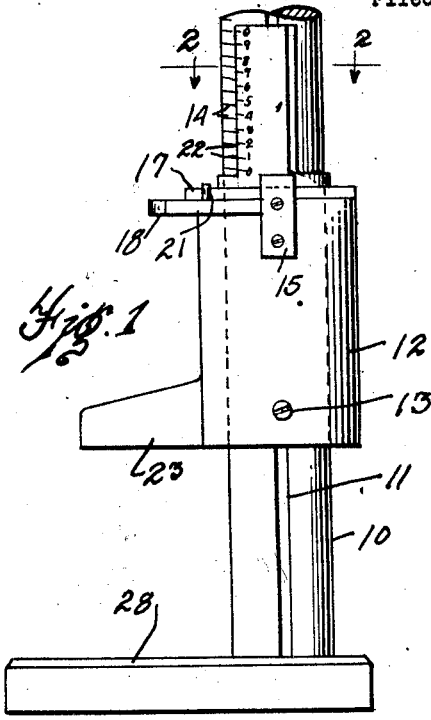
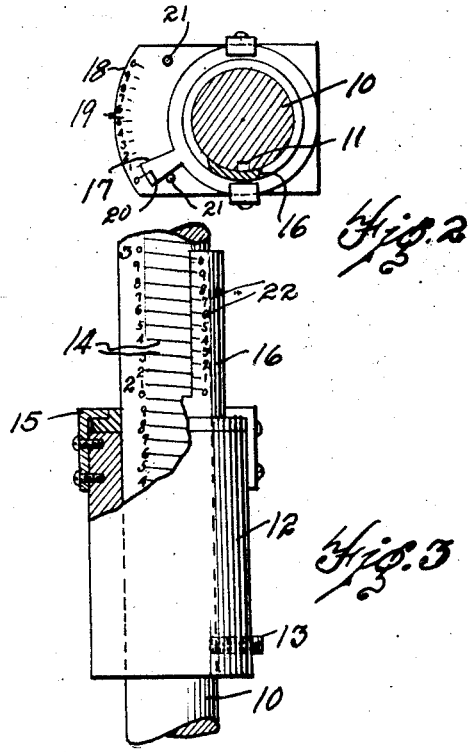
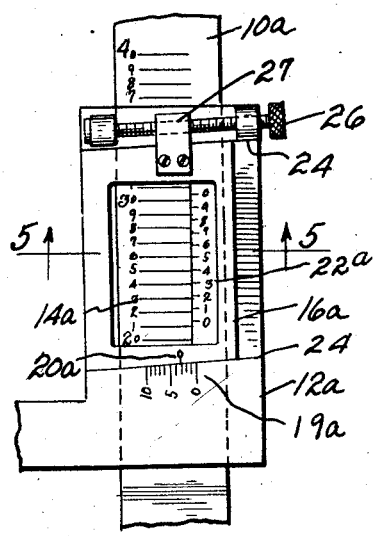
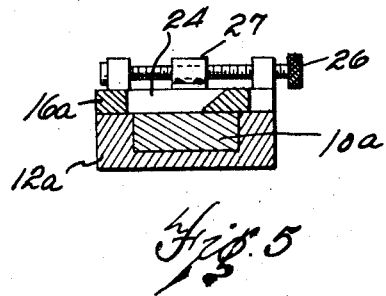
INVENTOR.
Joseph Lamb.
BY
ATTORNEY.

Patented Nov. 6, 1928.

1,690,733

UNITED STATES PATENT OFFICE.

JOSEPH LAMB, OF DETROIT, MICHIGAN.

MICROMETER GAUGE.

Application filed September 28, 1927. Serial No. 222,419.

This invention relates to improvements in micrometer gauges, and aims to provide a gauge which may be easily and accurately read.

It is an object of the invention to provide a micrometer gauge wherein a sleeve is movable longitudinally along a main stem, and a member is arranged on the sleeve in such a manner that it is permitted limited movement so that one scale on the member may be moved across calibrations on the main stem thereby also moving a pointer on said member with respect to a graduated scale on the sleeve.

Another object of the invention is to provide eleven graduations on the movable member which occupy the same total length as ten calibrations on the main stem with which they register; and to provide a single pointer, also on the movable member, which may register with, or between, any two of a number of graduations on the scale on the sleeve.

A further object of the invention is to provide a micrometer gauge wherein the movable member moves over the main stem calibrations at a very slight angle to their direction, so that the total movement of the member from one end of the calibrations to the other moves its graduations a distance exactly equal to one-tenth of that between two adjacent calibrations; and again the movement of the member from one end of the calibrations to the other moves the pointer from the first to the last graduation on the sleeve.

Having broadly outlined the major purposes of the invention I will now describe an embodiment thereof with the aid of the accompanying drawing, in which:

Figure 1 illustrates a side view of the invention.

Figure 2 is a section on the line 2—2 of Figure 1, and

Figure 3 is a detail showing part of the main stem, the sleeve and the rotary member.

Figure 4 is a partial view of a modified form of construction, and

Figure 5 is a section on the line 5—5 of Figure 4.

Referring to the drawings, it will be noted that Figures 1, 2 and 3 show the application of the invention to a circular main stem, and Figures 4 and 5 illustrate the invention when a multi-sided main stem is employed.

Referring first to Figures 1, 2 and 3 the main stem 10 is provided with a longitudinal slot or keyway 11. 12 designates a sleeve provided with means, such as the set screw 13, for engaging the slot 11 so as to limit the sleeve to longitudinal movement along the said stem.

On the periphery of the main stem for any desired distance therealong calibrations 14 are inscribed which usually extend around about one-fifth of the circumference. These calibrations, which are generally marked off at tenth of an inch intervals, must be so positioned that their upper and lower ends are longitudinally in line with one another.

Held against one end of the sleeve 12, as by a retainer 15, is a rotary member 16 having an outwardly projecting finger 17 thereon. 18 designates a projection on one side of the retainer having graduations 19 thereon with each of which an index 20 on the finger 17 may be brought into alignment by turning the member 16. Stops 21 towards the ends of the projection 18 limit the turning movement of the finger in both directions. The rotary member 16 is so shaped as to bear against the circumference of the main stem 10, and is provided with graduations 22 on one of its longitudinal margins. These graduations are preferably eleven in number and the whole eleven occupy the same total distance as any ten calibrations 14 on the main stem.

In the construction shown in the drawings the movement of the member 16 is around the main stem and the calibrations 14 thereon are so inclined that the total turning movement of the member 16 between the pins 21 moves each graduation thereon exactly one-tenth the distance between two calibrations on the stem. Obviously the stops 21 limit the turning movement of the rotary member so that it may only travel between the ends of the calibrations 14, and also so that the index 20 may only move between the first and last graduations 19, usually ten in number, on the projection 18.

23 designates an arm on the sleeve 12 between which and the upper surface of the base 28 measurements are taken.

Referring now to Figures 4, and 5, the main stem 10$^a$ in this case is shown multisided, and has a sleeve 12$^a$ therearound. One side of the stem 10$^a$ is provided with calibrations 14$^a$ at uniform intervals, usually a tenth of an inch apart. It will be noted that in this case the calibrations are shown at right angles to the length of the main stem. In the sleeve 12ª guides 24 are provided for a sliding member 16ª, and 26 designates a screw rotatably mounted on the sleeve which is in threaded engagement with a nut 27 secured to one side of the sliding member. On one margin of the latter adjacent to the main stem and parallel with the graduations on the latter graduations 22ª are inscribed, generally eleven in number, which occupy the same total length as any ten calibrations 14ª on the main stem.

On one of the guides 24 adjacent to one side of the sliding member a plurality of graduations 19ª are provided, and on the adjacent margin of the sliding member an index 20ª is inscribed. This index mark moves between the first and last graduations 19ª as the sliding member moves transversely across the length of the calibrations 14ª.

It will be noted that the guides 24 are slightly inclined to the length of the sliding member so that as the sliding member 16ª travels the full length of the calibrations 14ª, and also the full distance between the first and last graduations 19ª, it has moved longitudinally along the main stem a distance exactly equal to one-tenth of that between two adjacent calibrations.

While in Figures 1 and 3 the calibrations 14 are shown somewhat inclined, and the movement of the rotary member 16 is at right angles to the main stem at right angles to its axis, and in Figures 4 and 5 the calibrations are at right angles to the stem and the movement of the sliding member is inclined, it is obvious that the calibrations 14, or 14ª, may either be at right angles to, or inclined to, the length of the stem so long as the member 16, or 16ª, moves longitudinally along the main stem one-tenth of the distance between two adjacent calibrations as it travels the length of the latter.

In order to obtain a reading on the gauge a piece of work is placed with one end of the base 28, the sleeve is moved downwards until the arm 23 comes into contact with the opposite end of the work. The reading is then taken as follows: In Figure 4 for instance the reading, taken first from the calibrations on the main stem is 2 and something. To ascertain the decimals the sliding member has been moved to the left until one of the graduations thereon has registered with a calibration on the main stem. It will be seen that in this case the graduation 5 registered with the calibration 6, so that our reading so far is 2.15, since the calibration 14ª immediately below the zero of the graduated scale 22 indicates the first place of decimals, and the graduation 22—in this case 5—which is exactly opposite one of the calibrations 14ª—in this case 6—gives the second place of decimals. Meanwhile the index 20ª has travelled over the graduated scale 19ª so there the reading is approximately 4½. The whole reading is therefore 2.1545. When desired the graduated scale 19ª may be subdivided so that quarters or even tenths of thousandths may be accurately read.

While in the foregoing the preferred embodiment of the invention has been described and shown it is understood that the invention is subject to such modifications as fall within the scope of the appended claims.

What I claim as my invention and desire to secure by Letters Patent is:

1. In a micrometer gauge, the combination of a main stem having calibrations thereon, a sleeve slidable longitudinally on said main stem having a graduated scale thereon, and a member movable on said sleeve having graduations on one of its margins any one of which graduations is adapted to be brought into register with one of said calibrations, and said member also having a fixed index thereon adapted to move over said graduated scale.

2. In a micrometer gauge, the combination of a main stem having calibrations thereon substantially at right angles to its length, a sleeve slidable longitudinally on said main stem, and a member movable on said sleeve at a slight angle to the length of said calibrations, said member having graduations on one of its margins which are adapted to be moved across said calibrations, and a fixed index thereon, said sleeve having a graduated scale thereon with which said index is adapted to register.

3. In a micrometer gauge, the combination as described in claim 2 wherein stops are provided on the sleeve for limiting the movement of said movable member so that the latter may only move the full length of the calibrations during which movement the graduations on said movable member move laterally a distance equal to one tenth the distance between two adjacent calibrations, and wherein the graduations on the movable member are so spaced that eleven of them occupy the same total distance on the member as ten calibrations on the main stem.

4. In a micrometer gauge, the combination of a main stem having calibrations thereon, a sleeve slidable longitudinally on said main stem, a member on said sleeve permitted limited rotary movement thereon and having graduations on one of its margins adjacent to said calibrations so that said member may be moved around said stem until one of its graduations coincides with one of said calibrations, a fixed projection on said sleeve having a graduated scale thereon, and a finger on said member having an index thereon adapted to register on said graduated scale.

JOSEPH LAMB.